(12) United States Patent
Gupta et al.

(10) Patent No.: US 12,348,589 B1
(45) Date of Patent: Jul. 1, 2025

(54) ZERO DOWNTIME SERVICING OF DATAPATH SERVICES IN SOFTWARE DEFINED NETWORKS

(71) Applicant: MICROSOFT TECHNOLOGY LICENSING, LLC, Redmond, WA (US)

(72) Inventors: Avijit Gupta, Redmond, WA (US); Rishabh Tewari, Sammamish, WA (US); Deepak Bansal, Bellevue, WA (US); Weixi Chen, Berkeley, CA (US); Venkata Satish Katta, Bellevue, WA (US); Alfonso de la Morena, Austin, TX (US); Arun Jeedigunta Venkata Satya, Seattle, WA (US); Zexuan Zhao, Kirkland, WA (US); Kaixiang Miao, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 12 days.

(21) Appl. No.: 18/399,624

(22) Filed: Dec. 28, 2023

(51) Int. Cl.
*H04L 67/51* (2022.01)

(52) U.S. Cl.
CPC .................. *H04L 67/51* (2022.05)

(58) Field of Classification Search
CPC ........................................ H04L 67/51

USPC ........................................ 709/223
See application file for complete search history.

(56) References Cited

U.S. PATENT DOCUMENTS

| | | | | |
|---|---|---|---|---|
| 6,052,733 A | * | 4/2000 | Mahalingam | G06F 13/4027 714/24 |
| 2015/0263970 A1 | * | 9/2015 | Macchiano | H04L 45/22 709/223 |
| 2022/0329520 A1 | * | 10/2022 | Degrace | H04L 45/12 |

* cited by examiner

*Primary Examiner* — Wing F Chan
*Assistant Examiner* — Leon Y Tseng
(74) *Attorney, Agent, or Firm* — Han Gim; Newport IP, LLC

(57) ABSTRACT

High availability network services are provided in a in a virtual computing environment comprising a plurality of network devices running in a software defined network (SDN) of the virtual computing environment, the network devices comprising a plurality of SDN appliances configured to disaggregate enforcement of policies of the SDN from hosts of the virtual computing environment, the hosts implemented on servers communicatively coupled to network interfaces of the SDN appliances, the servers hosting a plurality of virtual machines, the SDN appliance comprising a plurality of smart network interface cards (fNICs) configured to implement functionality of the SDN appliances.

20 Claims, 5 Drawing Sheets

ZERO DOWNTIME SERVICING OF DATAPATH SERVICES IN SOFTWARE DEFINED NETWORKS

BACKGROUND

A data center is a facility that houses computer systems and various networking, storage, and other related components. Data centers may, for example, provide computing services to businesses and individuals as a remote computing service or provide "software as a service" (e.g., cloud computing). To facilitate efficient utilization of data center resources, virtualization technologies allow a physical computing device to host one or more virtual machines ("VM") that appear and operate as independent computer devices to a connected user. The data center can create, maintain or delete virtual machines in a dynamic manner.

A data center may implement software defined networks (SDN) which include a number of SDN intermediate devices such as an SDN appliance which is a platform that enables policy and functional disaggregation off the host devices. There are a number of issues with the SDN intermediate devices that can cause disruption to customers' traffic. It is with respect to these considerations and others that the disclosure made herein is presented.

SUMMARY

The present disclosure provides a way to efficiently maintain the health of SDN intermediate devices, avoid downtime of any active SDN intermediate device, and ultimately enable zero downtime of customer data and workflows in a SDN using a combination of features. Each processing unit in the SDN intermediate device comprises one or more attached network cards, where each of the network cards is paired with at least one additional card on another different processing unit to handle host-level failures. These paired cards form a ring and are managed to guarantee the health of the ring, e.g., at most one network card in the logical ring can be down at any given time. A mapping is maintained for logical and physical groupings of a given function, which is updated to provide a threshold service availability guarantee.

This Summary is provided to introduce a selection of concepts in a simplified form that are further described below in the Detailed Description. This Summary is not intended to limit the scope of the claimed subject matter. Furthermore, the claimed subject matter is not limited to implementations that solve any or all disadvantages noted in any part of this disclosure.

DRAWINGS

The Detailed Description is described with reference to the accompanying figures. In the description detailed herein, references are made to the accompanying drawings that form a part hereof, and that show, by way of illustration, specific embodiments or examples. The drawings herein are not drawn to scale. Like numerals represent like elements throughout the several figures.

DETAILED DESCRIPTION

Figure 1:
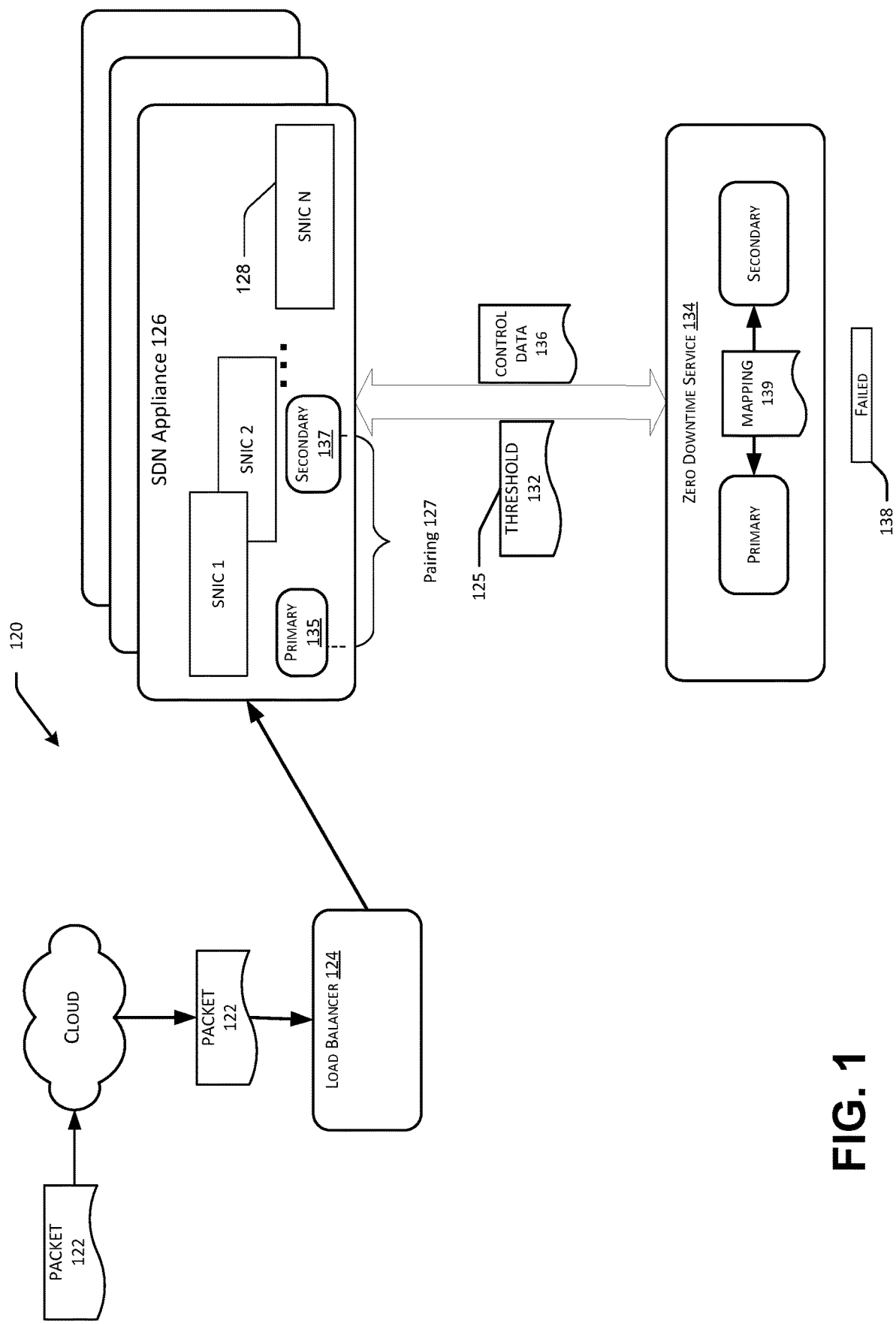
FIG. 1 is a diagram illustrating an example network in accordance with the present disclosure.

Software defined networks (SDN) include a number of SDN intermediate devices such as an SDN appliance, which is a platform that enables policy and functional disaggregation off the host devices. The SDN appliance can include a Smart Network Interface Card ("SmartNIC" or sNIC), which is also referred to as a floating NIC (fNIC), which may be a hardware-based acceleration device that implements various ways of leveraging hardware acceleration and offloading techniques to perform a function, such as implementing tasks in hard ASIC logic, implementing tasks in soft (configurable) FPGA logic, implementing some tasks as software on FPGA software processor overlays, implementing some tasks as software on hard ASIC processors, or a combination thereof. In some embodiments, the hardware-based acceleration device is a network communications device, such as a network interface card (NIC). The NIC is configured to perform complex processing. Such a NIC is referred to herein as a SmartNIC, sNIC or fNIC.

Cloud computing providers typically use a plurality of racks of servers to provide services in the cloud environment. A typical computing rack of a cloud service provider may have at least one top-of-rack (ToR) switch (two or more if redundancy is provided) and a number of servers. In some architectures, the servers are provisioned with one or more SmartNICs. The SmartNICs allow for each virtual machine (VM) to communicate to any other VM through various types of virtual tunnelling mechanisms. This ensures that a virtual network can be instantiated where data communications are contained within the virtual network boundaries and no other customer's VMs or other external VMs can communicate with it in any way.

Typically, each server is configured to host a number of VMs, containers, and various workloads, and include at least one SmartNIC (floating NIC). The SmartNIC or floating NIC provides a virtual interface to every VM hosted on the server. Through the implementation of one or more policies, it is possible for each VM to communicate with any other VM within its virtual network via the policies. These VMs can be on the same server or a different server, and can even be in another datacenter. The policies can be complex and numerous and require a high level of processing and memory associated with their implementation.

There are a number of issues with SDN intermediate devices such as SDN appliances that can cause disruptions to user traffic. The present disclosure provides a way to efficiently maintain health of SDN intermediate devices, avoid downtime of any active SDN intermediate device, and ultimately enable zero downtime of user data and workflows in a SDN using a combination of features. As used herein, the described functionality is referred to as zero downtime service. In an embodiment, each processing unit in the SDN intermediate device comprises one or more attached network cards, where each of the network cards is paired with at least one more card on another different processing unit to handle host-level failures. These paired cards form a ring and are managed to guarantee the health of the ring, e.g., at most one network card in the logical ring can be down at any given time. A mapping is maintained for logical and physical groupings of a given function, which is updated to provide a threshold service availability guarantee.

When maintenance is needed, in order to gracefully allow for the SDN intermediate device to be taken offline and functionality moved to a backup intermediate device, routes to the cards can be updated. For example, border gateway protocol (BGP) or similar protocols can be withdrawn which stops serving user traffic explicitly before being brought down for servicing. In another example, explicit tunneling can be used. In some embodiments, a policy engine for the SDN intermediate device is implemented where a determination is made if maintenance actions can proceed. In some scenarios, all operations are frozen until servicing actions are completed. In other scenarios, the data path may still be functioning when an error occurs, for example, if the control plane is in an error state but network devices are still functioning. In this case, the appliance should not be taken offline.

A variety of health signals are emitted by the SDN intermediate device which are monitored by a servicing engine that ensures that an unhealthy card is never left in rotation in the ring. In addition to indicating when rollouts can be deployed based on intermediate device health, the health signals are uniquely generated to indicate a potential datapath outage for a given user. This determination is made based on detection of configurations as well as health status of the intermediate device based on the emitted health signals. In some embodiments, a policy engine is provided that detects a potential data outage or other condition that can impact a user's data flows. Affected workloads are proactively moved to another appliance.

FIG. 1 illustrates an example virtual computing environment 120 where high availability (HA) network services are provided in the virtual computing environment 120. The virtual computing environment comprises a plurality of network devices running in a software defined network (SDN) of the virtual computing environment 120. The network devices comprise a plurality of SDN appliances 126 configured to disaggregate enforcement of policies of the SDN from hosts of the virtual computing environment 120. The hosts can be implemented on servers hosting a plurality of virtual machines that are communicatively coupled to network interfaces of the SDN appliances 126. The SDN appliances 126 comprise a plurality of smart network interface cards (sNICs) 128 configured to implement functionality of the SDN appliances 126. Each of the sNICs are paired 127 with at least one other sNIC on another SDN appliance. The paired sNICs 128 are configured to maintain control data 136 such that each sNIC can actively provide the high availability network services in response to a failure of a paired sNIC, where a backup sNIC 137 can provide the high availability network services if an active sNIC 135 is considered failed 138. The paired sNICs are configured as a logical ring wherein only one paired sNIC is allowed to be deactivated at one time. A mapping 139 is generated between logical and physical groupings of the paired sNICs and the high availability network services, which is updated to provide a threshold service availability guarantee 132. In response to a request to perform maintenance on one of the sNICs, the mapping 139 is used to determine if the threshold service availability 132 for the high availability network services associated with the one sNIC will be exceeded. A response is output based on the determining if the threshold service availability 132 for the high availability network services associated with the one sNIC will be exceeded.

In an embodiment, applications can each run their own monitoring service to monitor the health of different components of the zero downtime service and post customized properties. This may be used to change the machine state of the zero downtime service if the error level of the properties has been changed.

For example, if an appliance is in the H (Healthy) state and monitoring errors are posted by the application, the appliance will transit to F (Failing) state and may eventually enter D (Dead) state (manual repair required) if the machine remains in the F state for a threshold period of time (e.g., because either repair tasks did not recover the machine or repairs are not approved).

In an embodiment, the zero downtime service ensures the failing limit of a machine function, and monitoring properties can be used to report health status of appliance hosts and transit the machine state into the F state if appliance hosts are not healthy to prevent further maintenance operations from being triggered for a logical ring.

In some certain error scenarios, all operations are frozen until a given situation is understood before executing any repair action which could lead to delays. For example, a data path may be still functioning when an error occurs, for example, if the control plane is in a degraded state but network devices are still functioning. In this case the machine should not be taken down for repairs.

Figure 2:
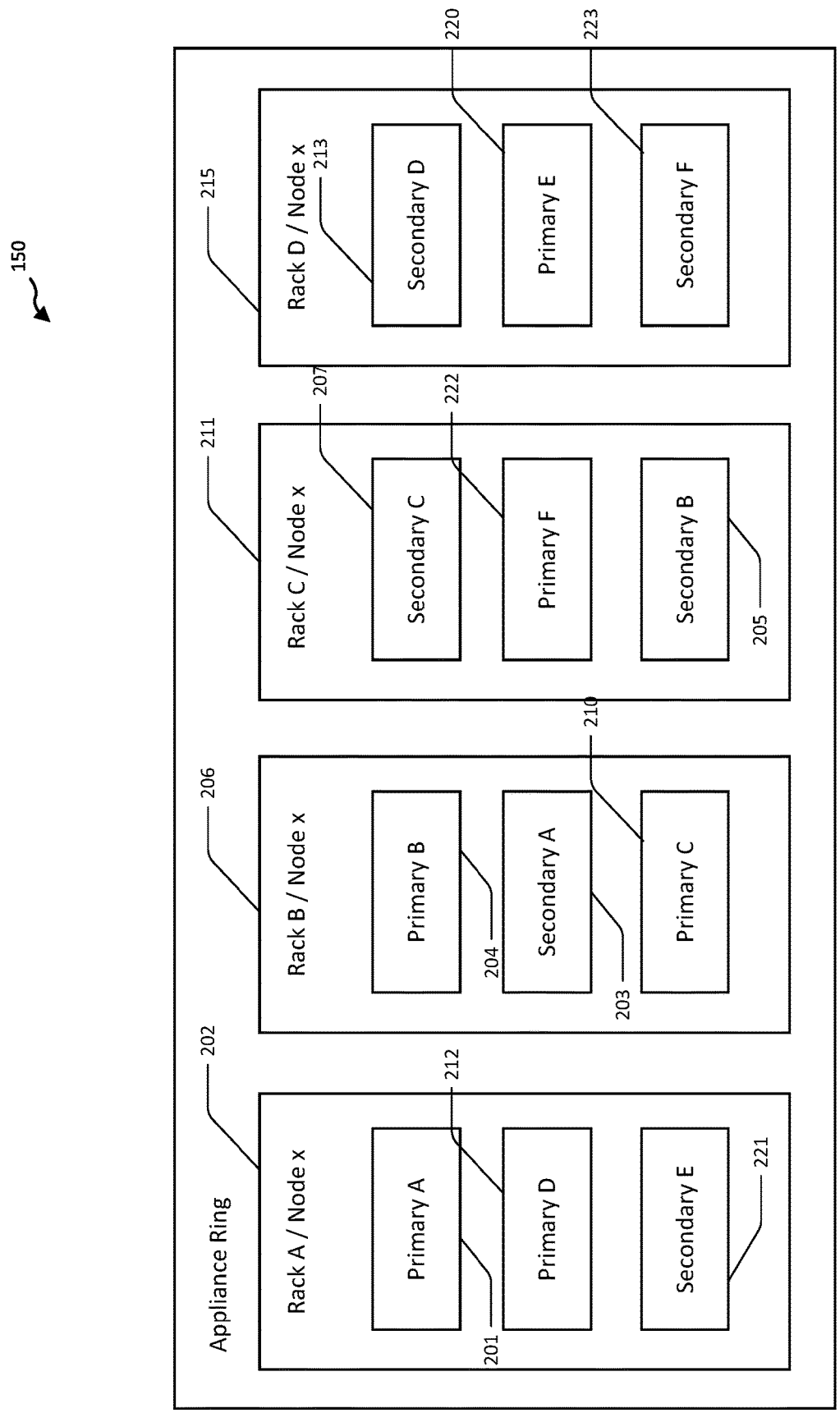
FIG. 2 is a diagram illustrating an example network in accordance with the present disclosure.

In an embodiment, the physical layout of the appliances can be aligned with the logical grouping of the machine functions, which enables service availability guarantees. For example, FIG. 2 illustrates a logical machine function grouping for an appliance. Setting the maximum upgradable units to 1 (how many that can be updated at one time) guarantees that only one node will be upgraded during an application rollout, OS upgrade, and the like. In the example shown in FIG. 2, primary card A 201 in rack A 202 has a secondary card A 203 in rack B 206, and primary card B 204 in rack B 206 has a secondary card B 205 in rack C 207. Primary card C 210 in rack B 206 has a secondary card C 207 in rack C 211, and primary card D 204 in rack A 202 has a secondary card D 213 in rack D 215. Primary card E 220 in rack D 215 has a secondary card E 221 in rack A 202, and primary card F 222 in rack C 211 has a secondary card F 223 in rack D 215. No primary/secondary pair are assigned to the same rack or node.

In an example, a failing limit at 25% guarantees that no repair operations will be performed if the percentage of the failing machine is larger than 25%. Concurrent repair operations can be avoided in the same machine function to guarantee data path availability. Only 1 node is allowed to be down at any time in the same machine function.

In an embodiment, a health manager running as a remote service and uses a host agent that continuously polls health status from components and posts health status to the monitoring properties which may result in a machine state change. In the case of an unhealthy health status, the property level is set to Error which will bring the machine into the F state, resulting in the blocking of future repair operations since the failing limit has reached the threshold.

The present disclosure allows for dataflows to be maintained while avoiding selection of machines for maintenance that are already unhealthy to minimize potential traffic disruption. The posting of monitoring properties allows the zero downtime service to be informed of the machine state and avoid potential maintenance being triggered in the same machine function to avoid bringing the ring into a state that causes data loss or disruptions. In an embodiment, appliance group coordination is implemented to enable the health of the ring to be maintained when repairs are performed.

In an embodiment, the zero downtime service automatically triggers repair operations on appliances that are in the F state in order to recover it (3 No-op, 3 restarts, 3 re-images, if all repair operations failed or are never executed, the machine will enter D step which means manual repair is required). The zero downtime service may determine the actual state of an appliance (e.g., what exactly is unhealthy and caused the F state), before determining if repairs are allowed.

In an embodiment, maintenance operations are not allowed automatically. In an embodiment, maintenance operations are frozen when an appliance is in the F state except situations that are known and expected, such as OS upgrades/firmware updates which may bring the appliance into the F state intentionally (e.g., BGP sessions are shut down prior to maintenance which transits the machine state into F since the zero downtime service detects that BGP is down and reports it through monitoring properties).

The above combination of features is used to enable zero downtime of user data and workflows in a SDN, which can be tailored to specific users and not just the data center or broader subsets of the data center.

Methods for creating connection records when a SYN packet arrives can be similar to what is commonly referred to as "slow path" as described in Disaggregated APIs for SONiC Hosts (DASH) open-source documentation found within Github. Connection flows can be re-simulated using the techniques described in application Ser. No. 17/855,730 "RE-SIMULATION OF UPDATED SDN CONNECTION FLOWS" filed Jun. 30, 2022, the contents of which are incorporated herein by reference. State synchronization can be achieved using the techniques described in application Ser. No. 17/958,346 "EFFICIENT STATE REPLICATION IN SDN NETWORKS" filed Oct. 1, 2022, the contents of which are incorporated herein by reference.

Figure 3:
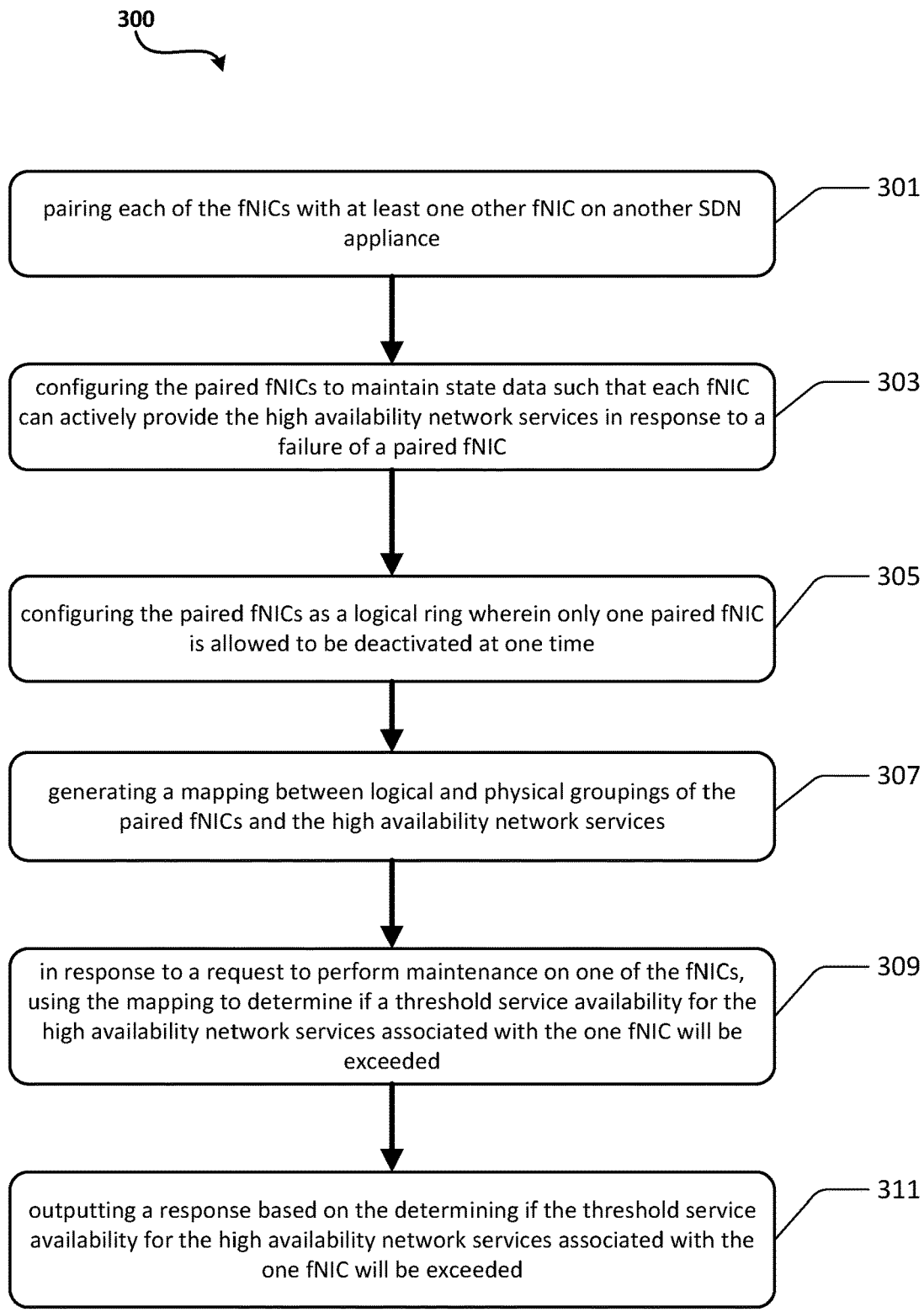
FIG. 3 is a flowchart depicting an example procedure in accordance with the present disclosure.

Turning now to FIG. 3, illustrated is an example procedure 300 for providing high availability network services in a virtual computing environment in accordance with the present disclosure. Such a procedure can be provided by functions illustrated, for example, in FIGS. 1-2. The virtual computing environment comprises a plurality of network devices running in a software defined network (SDN) of the virtual computing environment. The network devices comprise a plurality of SDN appliances configured to disaggregate enforcement of policies of the SDN from hosts of the virtual computing environment. The hosts are implemented on servers communicatively coupled to network interfaces of the SDN appliances. The servers host a plurality of virtual machines. The SDN appliance comprises a plurality of smart network interface cards (fNICs) configured to implement functionality of the SDN appliances.

Referring to FIG. 3, operation 301 illustrates pairing each of the fNICs with at least one other fNIC on another SDN appliance.

Operation 303 illustrates configuring the paired fNICs to maintain state data such that each fNIC can actively provide the high availability network services in response to a failure of a paired fNIC.

Operation 305 illustrates configuring the paired fNICs as a logical ring wherein only one paired fNIC is allowed to be deactivated at one time.

Operation 307 illustrates generating a mapping between logical and physical groupings of the paired fNICs and the high availability network services, which is updated to provide a threshold service availability guarantee.

Operation 309 illustrates in response to a request to perform maintenance on one of the fNICs, using the mapping to determine if a threshold service availability for the high availability network services associated with the one fNIC will be exceeded.

Operation 311 illustrates outputting a response based on the determining if the threshold service availability for the high availability network services associated with the one fNIC will be exceeded.

The various aspects of the disclosure are described herein with regard to certain examples and embodiments, which are intended to illustrate the disclosure. It should be appreciated that the subject matter presented herein is implemented as a computer process, a computer-controlled apparatus, or a computing system or an article of manufacture, such as a computer-readable storage medium. While the subject matter described herein is presented in the general context of program modules that execute on one or more computing devices, those skilled in the art will recognize that other implementations is performed in combination with other types of program modules. Generally, program modules include routines, programs, components, data structures and other types of structures that perform particular tasks or implement particular abstract data types.

Those skilled in the art will also appreciate that the subject matter described herein can be practiced on or in conjunction with other computer system configurations beyond those described herein, including multiprocessor systems. The embodiments described herein can also be practiced in distributed computing environments, where tasks are performed by remote processing devices that are linked through a communications network. In a distributed computing environment, program modules are located in both local and remote memory storage devices.

Networks established by or on behalf of a user to provide one or more services (such as various types of cloud-based computing or storage) accessible via the Internet and/or other networks to a distributed set of clients can be referred to as a service provider. Such a network includes one or more data centers such as data center 400 illustrated in FIG. 4, which are configured to host physical and/or virtualized computer servers, storage devices, networking equipment and the like, that is used to implement and distribute the infrastructure and services offered by the service provider.

Figure 4:
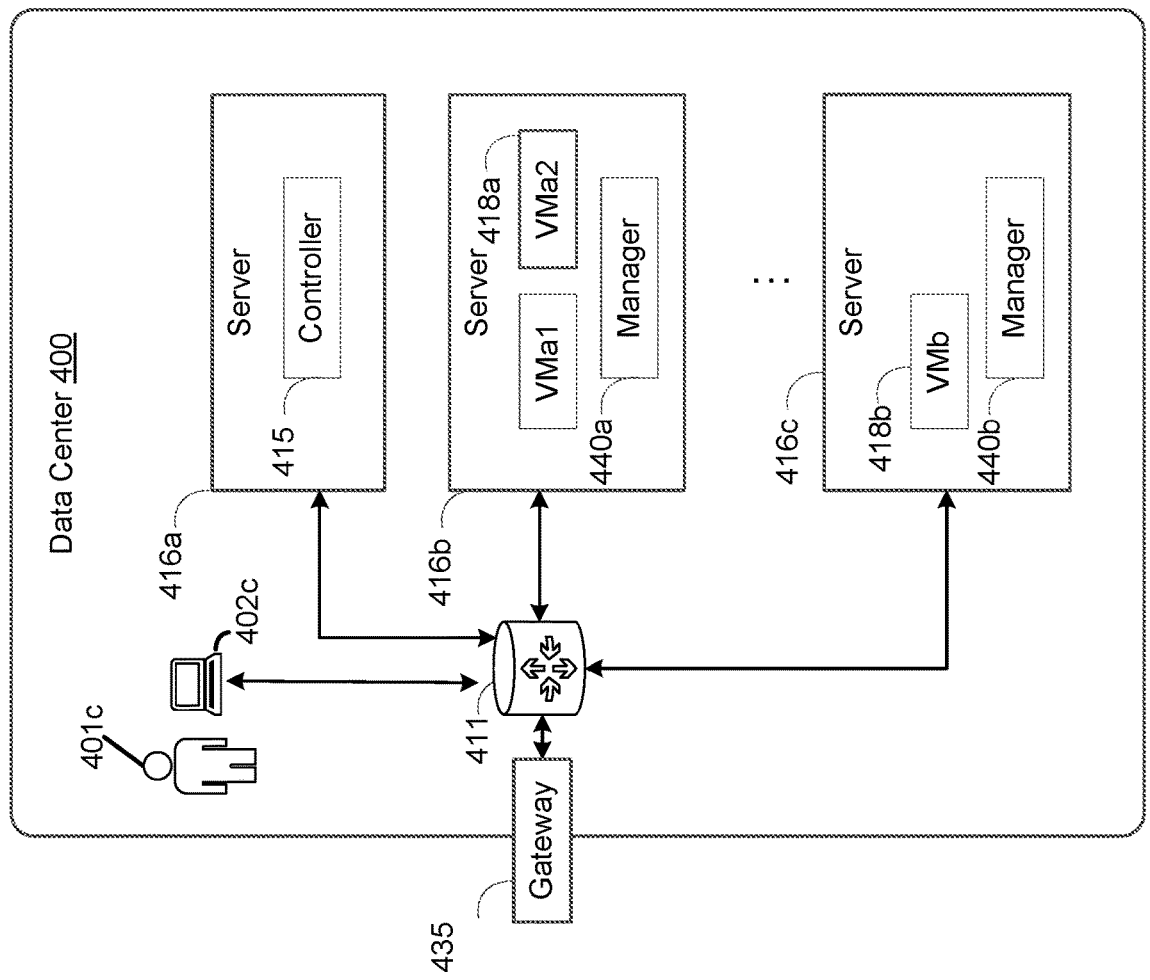
FIG. 4 is a diagram illustrating an example architecture in accordance with the present disclosure.
Figure 4:
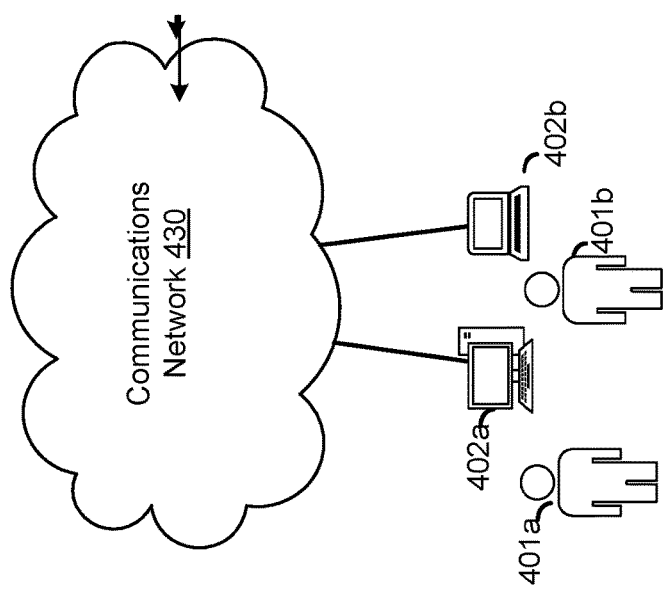

FIG. 4 illustrates a data center 400 that is configured to provide computing resources to users 401a, 401b, or 401c (which is referred herein singularly as "a user 401" or in the plural as "users 401") via user computers 402a, 402b, and 402c (which is referred herein singularly as "a computer 402" or in the plural as "computers 402") via a communications network 430. The computing resources provided by the data center 400 includes various types of resources, such as computing resources, data storage resources, data communication resources, and the like. Each type of computing resource can be general-purpose or available in a number of specific configurations. A virtual computing instance is referred to as a virtual machine and can, for example, comprise one or more servers with a specified computational capacity (which is specified by indicating the type and number of CPUs, the main memory size and so on) and a specified software stack (e.g., a particular version of an operating system, which in turn run on top of a hypervisor). In some embodiments, computing resources are available as virtual machines. The virtual machines are configured to execute applications, including Web servers, application servers, media servers, database servers, and the like. Data storage resources include file storage devices, block storage devices, and the like. Each type of computing resource can be available in different configurations, such as the number of processors, and size of memory and/or storage capacity. The resources in some embodiments are offered to clients in units referred to as instances, such as virtual machine instances or storage instances.

Data center 400 includes servers 416a, 416b, and 416c (referred to herein singularly as "a server 416" or in the plural as "servers 416") that provide computing resources available as virtual machines 418a and 418b (referred to herein singularly as "a virtual machine 418" or in the plural as "virtual machines 418"). The virtual machines 418 are configured to execute applications such as Web servers, application servers, media servers, database servers, and the like. Other resources include data storage resources (not shown on FIG. 4) and include file storage devices, block storage devices, and the like. Servers 416 also execute functions that manage and control allocation of resources in the data center, such as a controller 415. Controller 415 can be a fabric controller or another type of program configured to manage the allocation of virtual machines on servers 416.

Referring to FIG. 4, communications network 430 can, for example, be a publicly accessible network of linked networks and operated by various entities, such as the Internet. In other embodiments, communications network 430 is a private network, such as a corporate network that is wholly or partially inaccessible to the public.

Communications network 430 provides access to computers 402. Computers 402 include computers utilized by users 401. Computer 402a,402b or 402c can be a server, a desktop or laptop personal computer, a tablet computer, a smartphone, a set-top box, or any other computing device capable of accessing data center 400. User computer 402a or 402b connects directly to the Internet (e.g., via a cable modem). User computer 402c can be internal to the data center 400 and connect directly to the resources in the data center 400 via internal networks. Although only three user computers 402a,402b, and 402c are depicted, it should be appreciated that there can be multiple user computers.

Computers 402 are also utilized to configure aspects of the computing resources provided by data center 400. For example, data center 400 provides a Web interface through which aspects of its operation can be configured through the use of a Web browser application program executing on user computer 402. Alternatively, a stand-alone application program executing on user computer 402 can be used to access an application programming interface (API) exposed by data center 400 for performing the configuration operations.

Servers 416 are configured to provide the computing resources described above. One or more of the servers 416 are configured to execute a manager 440a or 440b (referred herein singularly as "a manager 440" or in the plural as "managers 440") configured to execute the virtual machines. The managers 420 can be a virtual machine monitor (VMM), fabric controller, or another type of program configured to enable the execution of virtual machines 418 on servers 416, for example.

It should be appreciated that although the embodiments disclosed above are discussed in the context of virtual machines, other types of implementations can be utilized with the concepts and technologies disclosed herein.

In the example data center 400 shown in FIG. 4, a network device 411 is utilized to interconnect the servers 416a and 416b. Network device 411 comprises one or more switches, routers, or other network devices. Network device 411 is also be connected to gateway 435, which is connected to communications network 430. Network device 411 facilitates communications within networks in data center 400, for example, by forwarding packets or other data communications as appropriate based on characteristics of such communications (e.g., header information including source and/or destination addresses, and protocol identifiers) and/or the characteristics of the private network (e.g., routes based on network topology). It will be appreciated that, for the sake of simplicity, various aspects of the computing systems and other devices of this example are illustrated without showing certain conventional details. Additional computing systems and other devices can be interconnected in other embodiments and interconnected in different ways.

It should be appreciated that the network topology illustrated in FIG. 4 has been greatly simplified and that many more networks and networking devices can be utilized to interconnect the various computing systems disclosed herein. These network topologies and devices should be apparent to those skilled in the art.

It should also be appreciated that data center 400 described in FIG. 4 is merely illustrative and that other implementations might be utilized. Additionally, it should be appreciated that the functionality disclosed herein might be implemented in software, hardware or a combination of software and hardware. Other implementations should be apparent to those skilled in the art. It should also be appreciated that a server, gateway, or other computing device comprise any combination of hardware or software that can interact and perform the described types of functionality, including desktop or other computers, database servers, network storage devices and other network devices, PDAs, tablets, smartphone, Internet appliances, television-based systems (e.g., using set top boxes and/or personal/digital video recorders), and various other consumer products that include appropriate communication capabilities. In addition, the functionality provided by the illustrated modules can, in some embodiments be combined in fewer modules or distributed in additional modules. Similarly, in some embodiments the functionality of some of the illustrated modules are not provided and/or other additional functionality can be implemented.

Figure 5:
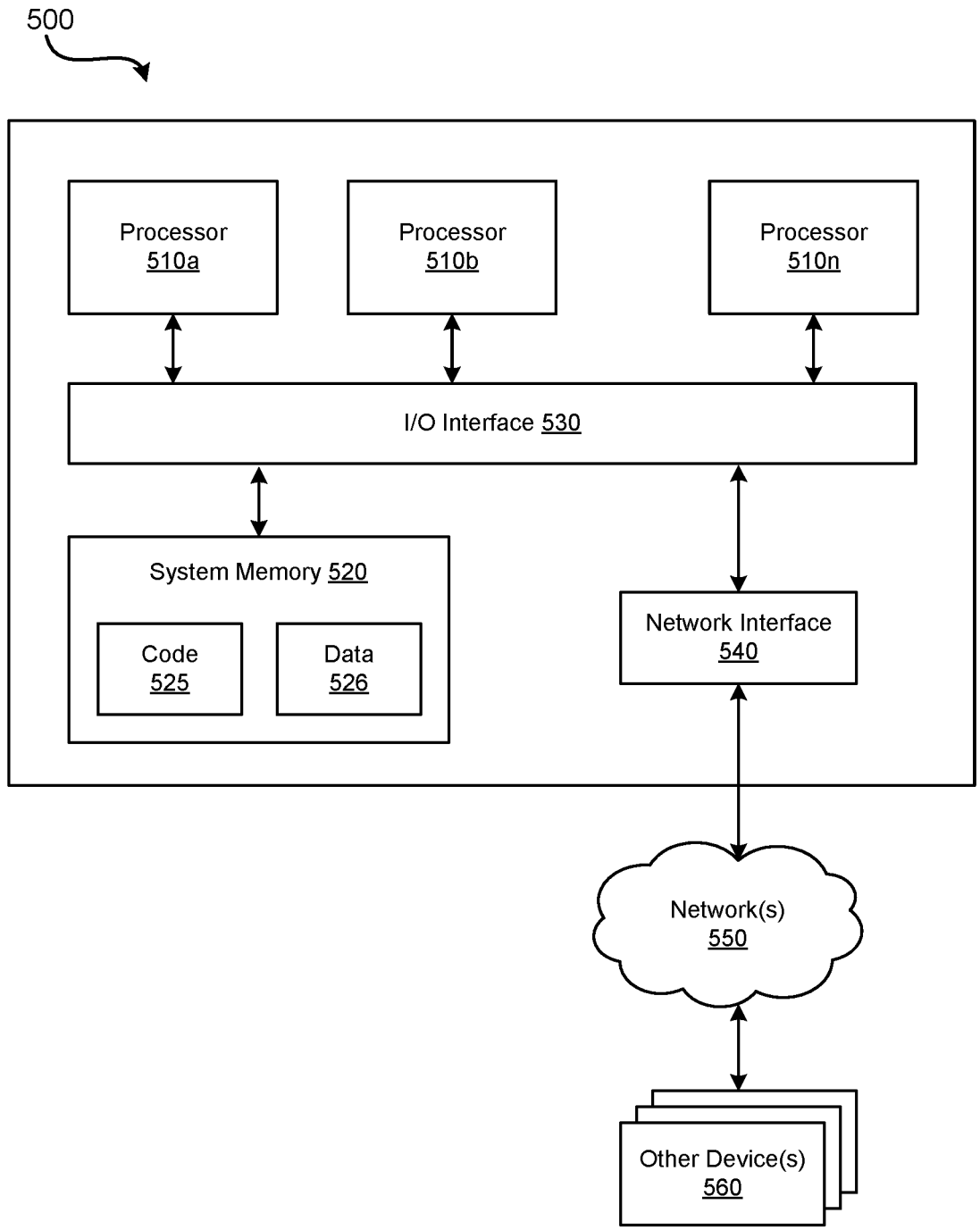
FIG. 5 is an example computing device in accordance with the present disclosure.

In some embodiments, a server that implements a portion or all of one or more of the technologies described herein, including the techniques to implement the communication of traffic includes a general-purpose computer system that includes or is configured to access one or more computer-accessible media. FIG. 5 illustrates such a general-purpose computing device 500. In the illustrated embodiment, computing device 500 includes a processing system comprising one or more processors 510a, 510b, and/or 510n (referred herein singularly as "a processor 510" or in the plural as "processors 510") coupled to a system memory 520 via an input/output (I/O) interface 530. Computing device 500 further includes a network interface 540 coupled to I/O interface 530.

In various embodiments, computing device 500 can be a uniprocessor system including one processor 510 or a multiprocessor system including several processors 510 (e.g., two, four, eight, or another suitable number). Processors 510 can be any suitable processors capable of executing instructions. For example, in various embodiments, processors 510 can be general-purpose or embedded processors implementing any of a variety of instruction set architectures (ISAs), such as the x56, PowerPC, SPARC, or MIPS ISAs, or any other suitable ISA. In multiprocessor systems, each of processors 510 commonly, but not necessarily, implement the same ISA.

System memory 520 is configured to store instructions and data accessible by processor(s) 510. In various embodiments, system memory 520 is implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques and data described above, are shown stored within system memory 520 as code 525 and data 526.

In one embodiment, I/O interface 530 is configured to coordinate I/O traffic between the processor 510, system memory 520, and any peripheral devices in the device, including network interface 540 or other peripheral interfaces. In some embodiments, I/O interface 530 performs any necessary protocol, timing, or other data transformations to convert data signals from one component (e.g., system memory 520) into a format suitable for use by another component (e.g., processor 510). In some embodiments, I/O interface 530 includes support for devices attached through various types of peripheral buses, such as a variant of the Peripheral Component Interconnect (PCI) bus standard or the Universal Serial Bus (USB) standard, for example. In some embodiments, the function of I/O interface 530 is split into two or more separate components. Also, in some embodiments some or all of the functionality of I/O interface 530, such as an interface to system memory 520, can be incorporated directly into processor 510.

Network interface 540 is be configured to allow data to be exchanged between computing device 500 and other device or devices 560 attached to a network or network(s) 550, such as other computer systems or devices as illustrated in FIGS. 1 through 4, for example. In various embodiments, network interface 540 supports communication via any suitable wired or wireless general data networks, such as types of Ethernet networks, for example. Additionally, network interface 540 supports communication via telecommunications/ telephony networks such as analog voice networks or digital fiber communications networks, via storage area networks such as Fibre Channel SANs or via any other suitable type of network and/or protocol.

In some embodiments, system memory 520 is one embodiment of a computer-accessible medium configured to store program instructions and data as described above for FIGS. 1-2 for implementing embodiments of the corresponding methods and apparatus. However, in other embodiments, program instructions and/or data are received, sent or stored upon different types of computer-accessible media. A computer-accessible medium includes non-transitory storage media or memory media, such as magnetic or optical media, e.g., disk or DVD/CD coupled to computing device 500 via I/O interface 530. A non-transitory computer-accessible storage medium also includes any volatile or non-volatile media, such as RAM (e.g., SDRAM, DDR SDRAM, RDRAM, SRAM) and ROM, that are included in some embodiments of computing device 500 as system memory 520 or another type of memory. Further, a computer-accessible medium include transmission media or signals such as electrical, electromagnetic or digital signals, conveyed via a communication medium such as a network and/or a wireless link, such those implemented via network interface 540. Portions or all of multiple computing devices, such as those illustrated in FIG. 5, are used to implement the described functionality in various embodiments; for example, software components running on a variety of different devices and servers collaborate to provide the functionality. In some embodiments, portions of the described functionality are implemented using storage devices, network devices, or special-purpose computer systems, in addition to or instead of being implemented using general-purpose computer systems. The term "computing device," as used herein, refers to at least all these types of devices and is not limited to these types of devices.

Various storage devices and their associated computer-readable media provide non-volatile storage for the computing devices described herein. Computer-readable media as discussed herein refer to a mass storage device, such as a solid-state drive, a hard disk or CD-ROM drive. However, it should be appreciated by those skilled in the art that computer-readable media can be any available computer storage media that can be accessed by a computing device.

By way of example, computer storage media include volatile and non-volatile, removable and non-removable media implemented in any method or technology for storage of information such as computer-readable instructions, data structures, program modules or other data. For example, computer media includes RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the computing devices discussed herein. For purposes of the claims, the phrase "computer storage medium," "computer-readable storage medium" and variations thereof, does not include waves, signals, and/or other transitory and/or intangible communication media, per se.

Encoding the software modules presented herein also transform the physical structure of the computer-readable media presented herein. The specific transformation of physical structure depend on various factors, in different implementations of this description. Examples of such factors include the technology used to implement the computer-readable media, whether the computer-readable media is characterized as primary or secondary storage, and the like. For example, if the computer-readable media is implemented as semiconductor-based memory, the software disclosed herein are encoded on the computer-readable media by transforming the physical state of the semiconductor memory. For example, the software transforms the state of transistors, capacitors, or other discrete circuit elements constituting the semiconductor memory. The software also transforms the physical state of such components in order to store data thereupon.

As another example, the computer-readable media disclosed herein can be implemented using magnetic or optical technology. In such implementations, the software presented herein transforms the physical state of magnetic or optical media, when the software is encoded therein. These transformations include altering the magnetic characteristics of particular locations within given magnetic media. These transformations also include altering the physical features or characteristics of particular locations within given optical media, to change the optical characteristics of those locations. Other transformations of physical media are possible without departing from the scope and spirit of the present description, with the foregoing examples provided only to facilitate this discussion.

In light of the above, it should be appreciated that many types of physical transformations take place in the disclosed computing devices in order to store and execute the software components and/or functionality presented herein. It is also contemplated that the disclosed computing devices do not include all of the illustrated components shown in FIG. 5, include other components that are not explicitly shown in FIG. 5, or utilize an architecture completely different than that shown in FIG. 5.

The disclosure presented herein also encompasses the subject matter set forth in the following clauses:

Clause 1: A method for providing high availability network services in a virtual computing environment comprising a plurality of network devices running in a software defined network (SDN) of the virtual computing environment, the network devices comprising a plurality of SDN appliances configured to disaggregate enforcement of policies of the SDN from hosts of the virtual computing environment, the hosts implemented on servers communicatively coupled to network interfaces of the SDN appliances, the servers hosting a plurality of virtual machines, containers, or workloads, the SDN appliance comprising a plurality of floating network interface cards (fNICs) configured to implement functionality of the SDN appliances, the method comprising:
   pairing each of the fNICs with at least one other fNIC on another SDN appliance;
   configuring the paired fNICs to maintain state data such that each fNIC can actively provide the high availability network services in response to a failure of a paired fNIC;
   configuring the paired fNICs as a logical ring wherein only one paired fNIC is allowed to be deactivated at one time;
   generating a mapping between logical and physical groupings of the paired fNICs and the high availability network services, wherein the mapping is configured to provide a service availability guarantee;
   in response to a request to perform maintenance on one of the fNICs, using the mapping to determine if a threshold service availability for the high availability network services associated with the one fNIC will be exceeded, thereby violating the service availability guarantee; and
   outputting a response based on the determining if the threshold service availability for the high availability network services associated with the one fNIC will be exceeded.

Clause 2: The method of clause 1, further comprising: in response to a request to perform maintenance on one of the sNICs, updating routes for user traffic associated with the one of the sNICs.

Clause 3: The method of any of clauses 1-2, further comprising: in response to detecting an error in one of the fNICs, continuing operation of the one of the fNICs if it is determined that associated data paths are functioning.

Clause 4: The method of any of clauses 1-2, further comprising:
   receiving health signals from the SDN appliances;
   based on the health signals, determining that one of the fNICs is unhealthy;
   in response to the determining, removing the one of the fNICs from its associated ring; and
   reconfiguring the paired fNICs to continue providing the high availability network services.

Clause 5: The method of any of clauses 1-4, wherein the reconfiguring is based on a policy associated with a user of the SDN.

Clause 6: The method of any of clauses 1-5, wherein the threshold service availability is 25%.

Clause 7: The method of clauses 1-6, further comprising maintaining health states for the sNICs, wherein the health states are updated by applications running in the SDN.

Clause 8: The method of any of clauses 1-7, wherein the health states comprise a H (Healthy) indicative that data flows are healthy, F (Failing) state indicative that an error has been detected, and D (Dead) state indicative that maintenance action is needed.

Clause 9: A system for providing high availability network services in a virtual computing environment comprising a plurality of network devices running in a software defined network (SDN) of the virtual computing environment, the network devices comprising a plurality of SDN appliances configured to disaggregate enforcement of policies of the SDN from hosts of the virtual computing environment, the hosts implemented on servers communicatively coupled to network interfaces of the SDN appliances, the servers hosting a plurality of virtual machines, the SDN appliance comprising a plurality of floating network interface cards (fNICs) configured to implement functionality of the SDN appliances, the system comprising:
   a processing system; and
   a memory storing computer-executable instructions thereupon which, when executed by the processing system, cause the system to perform operations comprising:
   pairing each of the fNICs with at least one other fNIC on another SDN appliance;
   configuring the paired fNICs to maintain state data such that each fNIC can actively provide the high availability network services in response to a failure of a paired fNIC;
   configuring the paired fNICs as a logical ring wherein only one paired fNIC is allowed to be deactivated at one time;
   generating a mapping between logical and physical groupings of the paired fNICs and the high availability network services, which is updated to provide a threshold service availability guarantee;
   in response to a request to perform maintenance on one of the fNICs, using the mapping to determine if a threshold service availability for the high availability network services associated with the one fNIC will be exceeded; and
   outputting a response based on the determining if the threshold service availability for the high availability network services associated with the one fNIC will be exceeded.

Clause 10: The system of clause 9, further comprising computer-executable instructions thereupon which, when executed by the processing system, cause the system to perform operations comprising:
   in response to a request to perform maintenance on one of the fNICs, withdrawing border gateway protocol (BGP) for user traffic associated with the one of the fNICs.

Clause 11: The system of any of clauses 9 and 10, further comprising computer-executable instructions thereupon which, when executed by the processing system, cause the system to perform operations comprising:
   in response to detecting an error in one of the fNICs, continuing operation of the one of the fNICs if it is determined that associated data paths are functioning.

Clause 12: The system of any of clauses 9-11, further comprising computer-executable instructions thereupon which, when executed by the processing system, cause the system to perform operations comprising:
   receiving health signals from the SDN appliances;
   based on the health signals, determining that one of the fNICs is unhealthy;

in response to the determining, removing the one of the fNICs from its associated ring; and reconfiguring the paired fNICs to continue providing the high availability network services.

Clause 13: The system of any of clauses 9-12, wherein the reconfiguring is based on a policy associated with a user of the SDN.

Clause 14: The system of any of clauses 9-13, wherein the threshold service availability is 25%.

Clause 15: The system of any of clauses 9-14, further comprising computer-executable instructions thereupon which, when executed by the processing system, cause the system to perform operations comprising:

maintaining health states for the fNICs, wherein the health states are updated by applications running in the SDN.

Clause 16: The system of any clauses 9-15, wherein the health states comprise a H (Healthy) indicative that data flows are healthy, F (Failing) state indicative that an error has been detected, and D (Dead) state indicative that maintenance action is needed.

Clause 17: A computer-readable storage medium storing computer-executable instructions thereupon which, when executed by a processing system, cause the processing system to perform operations comprising:

pairing each of a plurality of smart network interface cards (fNICs) with at least one other fNIC on an SDN appliance of a virtual computing environment comprising a plurality of network devices running in a software defined network (SDN) of the virtual computing environment, the network devices comprising a plurality of SDN appliances configured to disaggregate enforcement of policies of the SDN from hosts of the virtual computing environment, the hosts implemented on servers communicatively coupled to network interfaces of the SDN appliances, the servers hosting a plurality of virtual machines, the SDN appliance comprising a plurality of smart network interface cards (fNICs) configured to implement functionality of the SDN appliances;

configuring the paired fNICs to maintain state data such that each fNIC can actively provide high availability network services in response to a failure of a paired fNIC;

configuring the paired fNICs as a logical ring wherein only one paired fNIC is allowed to be deactivated at one time;

generating a mapping between logical and physical groupings of the paired fNICs and the high availability network services, which is updated to provide a threshold service availability guarantee;

in response to a request to perform maintenance on one of the fNICs, using the mapping to determine if a threshold service availability for the high availability network services associated with the one fNIC will be exceeded; and outputting a response based on the determining if the threshold service availability for the high availability network services associated with the one fNIC will be exceeded.

Clause 18: The computer-readable storage medium of clause 17, further comprising computer-executable instructions thereupon which, when executed by a processing system, cause the processing system to perform operations comprising:

in response to a request to perform maintenance on one of the fNICs, withdrawing border gateway protocol (BGP) for user traffic associated with the one of the fNICs.

Clause 19: The computer-readable storage medium of any of clauses 17 and 18, further comprising computer-executable instructions thereupon which, when executed by a processing system, cause the processing system to perform operations comprising:

in response to detecting an error in one of the fNICs, continuing operation of the one of the fNICs if it is determined that associated data paths are functioning.

Clause 20: The computer-readable storage medium of any of the clauses 17-19, further comprising computer-executable instructions thereupon which, when executed by a processing system, cause the processing system to perform operations comprising:

receiving health signals from the SDN appliances;

based on the health signals, determining that one of the fNICs is unhealthy;

in response to the determining, removing the one of the fNICs from its associated ring; and reconfiguring the paired fNICs to continue providing the high availability network services.

The invention claimed is:

1. A method for providing high availability network services in a virtual computing environment comprising a plurality of network devices running in a software defined network (SDN) of the virtual computing environment, the network devices comprising a plurality of SDN appliances configured to disaggregate enforcement of policies of the SDN from hosts of the virtual computing environment, the hosts implemented on servers communicatively coupled to network interfaces of the SDN appliances, the servers hosting a plurality of virtual machines, containers, or workloads, the SDN appliance comprising a plurality of floating network interface cards (fNICs) configured to implement functionality of the SDN appliances, the method comprising:

pairing each of the fNICs with at least one other fNIC on another SDN appliance;

configuring the paired fNICs to maintain state data such that each fNIC can actively provide the high availability network services in response to a failure of a paired fNIC;

configuring the paired fNICs as a logical ring wherein only one paired fNIC is allowed to be deactivated at one time;

generating a mapping between logical and physical groupings of the paired fNICs and the high availability network services, wherein the mapping is configured to provide a service availability guarantee;

in response to a request to perform maintenance on one of the fNICs, using the mapping to determine if a threshold service availability for the high availability network services associated with the one fNIC will be exceeded, thereby violating the service availability guarantee; and outputting a response based on the determining if the threshold service availability for the high availability network services associated with the one fNIC will be exceeded.

2. The method of claim 1, further comprising:

in response to a request to perform maintenance on one of the sNICs, updating routes for user traffic associated with the one of the sNICs.

3. The method of claim 1, further comprising:
in response to detecting an error in one of the fNICs, continuing operation of the one of the fNICs if it is determined that associated data paths are functioning.

4. The method of claim 1, further comprising:
receiving health signals from the SDN appliances;
based on the health signals, determining that one of the fNICs is unhealthy;
in response to the determining, removing the one of the fNICs from its associated ring; and
reconfiguring the paired fNICs to continue providing the high availability network services.

5. The method of claim 4, wherein the reconfiguring is based on a policy associated with a user of the SDN.

6. The method of claim 1, wherein the threshold service availability is 25%.

7. The method of claim 1, further comprising maintaining health states for the sNICs, wherein the health states are updated by applications running in the SDN.

8. The method of claim 7, wherein the health states comprise a H (Healthy) indicative that data flows are healthy, F (Failing) state indicative that an error has been detected, and D (Dead) state indicative that maintenance action is needed.

9. A system for providing high availability network services in a virtual computing environment comprising a plurality of network devices running in a software defined network (SDN) of the virtual computing environment, the network devices comprising a plurality of SDN appliances configured to disaggregate enforcement of policies of the SDN from hosts of the virtual computing environment, the hosts implemented on servers communicatively coupled to network interfaces of the SDN appliances, the servers hosting a plurality of virtual machines, the SDN appliance comprising a plurality of floating network interface cards (fNICs) configured to implement functionality of the SDN appliances, the system comprising:
a processing system; and
a memory storing computer-executable instructions thereupon which, when executed by the processing system, cause the system to perform operations comprising:
pairing each of the fNICs with at least one other fNIC on another SDN appliance;
configuring the paired fNICs to maintain state data such that each fNIC can actively provide the high availability network services in response to a failure of a paired fNIC;
configuring the paired fNICs as a logical ring wherein only one paired fNIC is allowed to be deactivated at one time;
generating a mapping between logical and physical groupings of the paired fNICs and the high availability network services, which is updated to provide a threshold service availability guarantee;
in response to a request to perform maintenance on one of the fNICs, using the mapping to determine if a threshold service availability for the high availability network services associated with the one fNIC will be exceeded; and
outputting a response based on the determining if the threshold service availability for the high availability network services associated with the one fNIC will be exceeded.

10. The system of claim 9, further comprising computer-executable instructions thereupon which, when executed by the processing system, cause the system to perform operations comprising:
in response to a request to perform maintenance on one of the fNICs, withdrawing border gateway protocol (BGP) for user traffic associated with the one of the fNICs.

11. The system of claim 9, further comprising computer-executable instructions thereupon which, when executed by the processing system, cause the system to perform operations comprising:
in response to detecting an error in one of the fNICs, continuing operation of the one of the fNICs if it is determined that associated data paths are functioning.

12. The system of claim 9, further comprising computer-executable instructions thereupon which, when executed by the processing system, cause the system to perform operations comprising:
receiving health signals from the SDN appliances;
based on the health signals, determining that one of the fNICs is unhealthy;
in response to the determining, removing the one of the fNICs from its associated ring; and
reconfiguring the paired fNICs to continue providing the high availability network services.

13. The system of claim 12, wherein the reconfiguring is based on a policy associated with a user of the SDN.

14. The system of claim 9, wherein the threshold service availability is 25%.

15. The system of claim 9, further comprising computer-executable instructions thereupon which, when executed by the processing system, cause the system to perform operations comprising:
maintaining health states for the fNICs, wherein the health states are updated by applications running in the SDN.

16. The system of claim 15, wherein the health states comprise a H (Healthy) indicative that data flows are healthy, F (Failing) state indicative that an error has been detected, and D (Dead) state indicative that maintenance action is needed.

17. A computer-readable storage medium storing computer-executable instructions thereupon which, when executed by a processing system, cause the processing system to perform operations comprising:
pairing each of a plurality of smart network interface cards (fNICs) with at least one other fNIC on an SDN appliance of a virtual computing environment comprising a plurality of network devices running in a software defined network (SDN) of the virtual computing environment, the network devices comprising a plurality of SDN appliances configured to disaggregate enforcement of policies of the SDN from hosts of the virtual computing environment, the hosts implemented on servers communicatively coupled to network interfaces of the SDN appliances, the servers hosting a plurality of virtual machines, the SDN appliance comprising a plurality of smart network interface cards (fNICs) configured to implement functionality of the SDN appliances;
configuring the paired fNICs to maintain state data such that each fNIC can actively provide high availability network services in response to a failure of a paired fNIC;
configuring the paired fNICs as a logical ring wherein only one paired fNIC is allowed to be deactivated at one time;
generating a mapping between logical and physical groupings of the paired fNICs and the high availability network services, which is updated to provide a threshold service availability guarantee;

in response to a request to perform maintenance on one of the fNICs, using the mapping to determine if a threshold service availability for the high availability network services associated with the one fNIC will be exceeded; and outputting a response based on the determining if the threshold service availability for the high availability network services associated with the one fNIC will be exceeded.

18. The computer-readable storage medium of claim 17, further comprising computer-executable instructions thereupon which, when executed by a processing system, cause the processing system to perform operations comprising:

in response to a request to perform maintenance on one of the fNICs, withdrawing border gateway protocol (BGP) for user traffic associated with the one of the fNICs.

19. The computer-readable storage medium of claim 17, further comprising computer-executable instructions thereupon which, when executed by a processing system, cause the processing system to perform operations comprising:

in response to detecting an error in one of the fNICs, continuing operation of the one of the fNICs if it is determined that associated data paths are functioning.

20. The computer-readable storage medium of claim 17, further comprising computer-executable instructions thereupon which, when executed by a processing system, cause the processing system to perform operations comprising:

receiving health signals from the SDN appliances;

based on the health signals, determining that one of the fNICs is unhealthy;

in response to the determining, removing the one of the fNICs from its associated ring; and reconfiguring the paired fNICs to continue providing the high availability network services.

* * * * *